(12) United States Patent
Upadhyay et al.

(10) Patent No.: US 8,799,372 B1
(45) Date of Patent: Aug. 5, 2014

(54) MANAGEMENT OF REFERENCED OBJECT BASED ON SIZE OF REFERENCED OBJECT

(75) Inventors: Piyush Upadhyay, Mission, KS (US); Badri P. Subramanyan, Overland Park, KS (US); John Davis, Kansas City, MO (US); Ayodeji Abidogun, Overland Park, KS (US); Lyle Bertz, Lee's Summit, MO (US)

(73) Assignee: Sprint Spectrum, L.P., Overland Park, KS (US)

( * ) Notice: Subject to any disclaimer, the term of this patent is extended or adjusted under 35 U.S.C. 154(b) by 486 days.

(21) Appl. No.: 12/247,100

(22) Filed: Oct. 7, 2008

(51) Int. Cl.
*G06F 15/16* (2006.01)
*G06F 15/167* (2006.01)

(52) U.S. Cl.
USPC ........... 709/206; 709/204; 709/205; 709/217; 709/212; 709/222

(58) Field of Classification Search
None
See application file for complete search history.

(56) References Cited

U.S. PATENT DOCUMENTS

| 5,857,189 | A | * | 1/1999 | Riddle | 1/1 |
| 6,185,208 | B1 | * | 2/2001 | Liao | 370/392 |
| 2003/0105869 | A1 | * | 6/2003 | Matsui et al. | 709/227 |
| 2003/0132955 | A1 | * | 7/2003 | Le Floch | 345/723 |
| 2004/0083291 | A1 | * | 4/2004 | Pessi et al. | 709/227 |
| 2004/0128355 | A1 | * | 7/2004 | Chao et al. | 709/206 |
| 2004/0260775 | A1 | * | 12/2004 | Fedele | 709/206 |
| 2005/0053018 | A1 | * | 3/2005 | Hoppe-Boeken et al. | 370/260 |
| 2006/0002377 | A1 | * | 1/2006 | Skog et al. | 370/352 |
| 2006/0143282 | A1 | * | 6/2006 | Brown et al. | 709/217 |
| 2006/0239215 | A1 | * | 10/2006 | Munje | 370/310 |
| 2007/0011256 | A1 | * | 1/2007 | Klein | 709/206 |
| 2007/0192474 | A1 | * | 8/2007 | Decasper et al. | 709/223 |

OTHER PUBLICATIONS http://www.alliedtelesis.com/media/fount/log_message_reference/aw-log-ref.pdf "Log Message Reference"—Allied War OS, Apr. 2008.*

* cited by examiner

*Primary Examiner* — Randy Scott

(57) ABSTRACT

A method is disclosed for pre-sending content size information so that content objects that might exceed the client device's resources are not sent in subsequent content transmissions. For example, a network node may receive from a content server a content message directed to a client device, wherein the content message includes a plurality of object references, each referencing respectively an object that is not contained in the content message. The network node may determine an object size of at least one of the objects and a supported content size for the client device. Based upon the determined object size and the determined supported content size of the client device, the network node may modify the content message by removing the object reference referencing the at least one object and then send the modified content message to the client device.

16 Claims, 7 Drawing Sheets

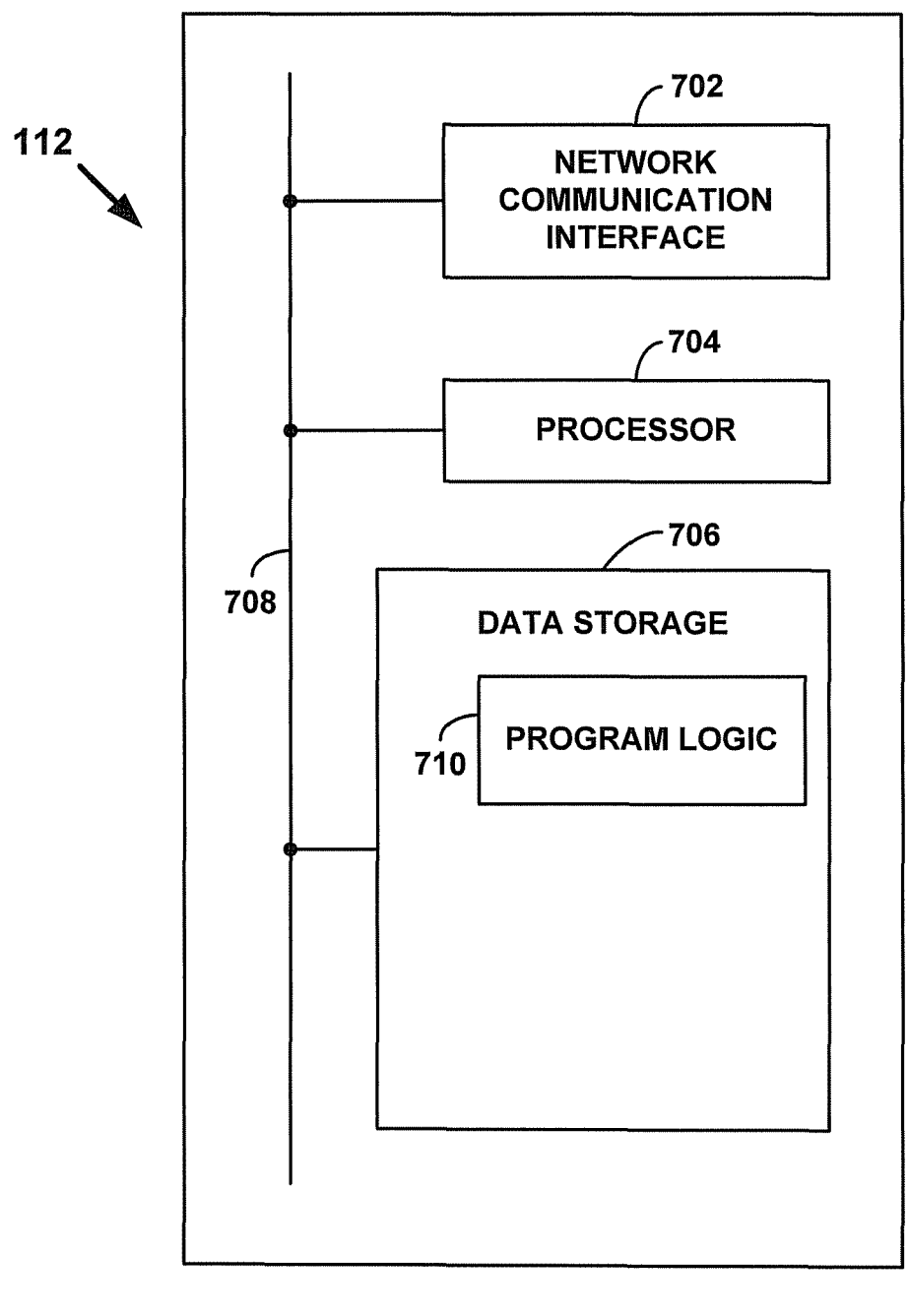

US 8,799,372 B1

MANAGEMENT OF REFERENCED OBJECT BASED ON SIZE OF REFERENCED OBJECT

BACKGROUND

The widespread availability of the Internet and mobile communications has ushered in an era of convenience and productivity never before seen. At the same time, however, the widespread use of data communications has strained both the capacity of communications channels used for data communications and the telecommunications equipment, such as network servers and gateways that service those channels. As users of phones, computers, and other client devices continue to download more content (such as data, web site content, email, etc.), service and content providers demand greater efficiency within their data communications so that they do not exceed channel capacity and equipment limitations.

One source of inefficient data communications stems from web (Internet) browsing. As a current example, when a user of a client device attempts to navigate to a web page, the client device's browser will send a request for the page, and a server may initially return an HTML representation of the page as an HTTP message. The HTML code might include address links to objects, such as images, that are meant to be displayed or presented within the web page. The initial HTTP message response will normally contain, in the header of the message, the content size of the page as sent, but not the size of the other linked objects on the page. Subsequently, the browser will normally send additional content requests directed to the address links in order to obtain the linked objects. This method has shortcomings, particularly in the mobile client environment, where client devices may have limited resources, such as finite memory and processor capabilities. Currently, a client device must get the original HTML page and then attempt to obtain the linked objects before the client device realizes that it is not able to process the page due to, for example, memory or processor constraints. Consequently, the client device uses up significant device resources, radio-frequency ("RF") and network resources, and the user's time trying to display a page which may not even be fully renderable on the client device.

OVERVIEW

To help avoid inefficiencies related to transmission and/or receipt of web pages whose display would exceed the resource limitations of a client device, it would be advantageous to provide a method to pre-send content size information to the client device or to a network node, so that the client device or the network node can determine whether to request or send objects, based on the size of the objects and the capabilities of the client device.

Disclosed herein is a method for pre-sending content size information for content requested by mobile users. According to the method, a network node, such as a gateway or a portal or any other network intermediary, may receive from a content server a content message directed to a client device. The content message may include a plurality of object references, each referencing respectively an object that is not contained in the content message. The network node may then determine an object size of at least one of the objects and a supported content size for the client device. The network node may then determine, based upon the determined object size and the determined supported content size of the client device, whether to remove the object reference referencing the at least one object. The network node may then, responsive to a determination that the object reference should be removed, modify the content message by removing the object reference and then send the modified content message from the network node to the client device.

According to another method disclosed herein, a client device, such as a cellular phone or any other mobile station, may send a content request. The client device may then receive a content message responsive to the content request, wherein the content message includes a plurality of object references. Each object reference references an object that is not contained in the content message. The client device may then determine an object size of at least one of the objects and a supported content size for the client device. The client device may also determine, based upon the determined object size of the at least one object and the determined supported content size of the client device, whether to request the at least one object. Responsive to a determination that the at least one object should be requested, the client device may then request the at least one object.

Additionally disclosed herein is a network node comprising a network interface, a processor, data storage, and program instructions stored in the data storage. The program instructions may be executable by the processor to carry out functions including: (i) receiving from a content server a content message directed to a client device, wherein the content message includes a plurality of object references, each referencing respectively an object that is not contained in the content message; (ii) determining an object size of at least one of the objects; (iii) determining a supported content size for the client device; (iv) for the reference to the at least one object, (1) determining, based upon the determined object size and the determined supported content size of the client device, whether to remove the object reference referencing the at least one object, and (2) responsive to a determination that the object reference should be removed, modifying the content message by removing the object reference, and (v) sending the modified content message from the network node to the client device.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which:

FIG. 7 is a block diagram illustrating exemplary components of a network node in accordance with an embodiment of the invention.

DETAILED DESCRIPTION

Figure 1:
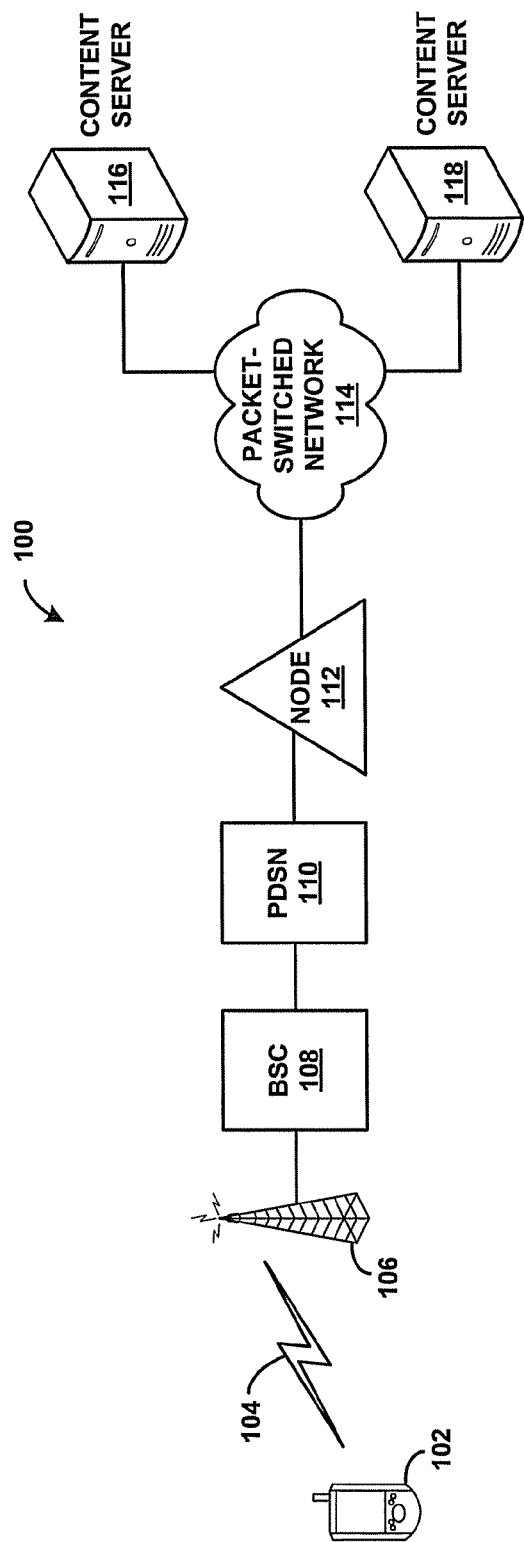
FIG. 1 is a block diagram of an exemplary communication system.

Referring to the drawings, as noted above, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

FIG. 1 illustrates an exemplary system 100 in which embodiments of this invention can be implemented. By way of example, the client device 102 of FIG. 1 may be a 3G or more advanced mobile client device such as a cellular or PCS telephone or personal digital assistant (e.g., Palm®, Pocket PC®, Windows Mobile®, or Android type device) for instance. As such, the client device 102 will likely have a relatively small display screen. Additionally, because the display screen may be too small to display full size HTML pages, the mobile station may be equipped with a "microbrowser," which is a web browser tailored to present web content on a smaller handset display. An exemplary microbrowser is the Openwave™ Mobile Browser available from Openwave Systems Inc., which can be arranged to provide mobile information access through compliance with the industry standard Wireless Application Protocol (WAP) as well as various markup languages such as HDML, WML, XHTML, and cHTML. Opera® Mobile, Opera Mini™, and Mozilla Fennec are other examples of microbrowsers.

Alternatively, the client device 102 may have a small display, yet may run a full scale web browser which can conventionally receive and interpret HTML web content and may or may not specially tailor content to the small display of a mobile device. Examples of such browsers are Windows® Internet Explorer®, Mozilla Firefox™, Netscape Navigator®, Opera® Web Browser, Apple Safari®, and Google® Chrome. For ease of discussion, the term "browser," as used herein, should be construed to incorporate both full scale browsers and microbrowsers and any other software application that enables a user to display and interact with text, images, videos, music and other information typically located on a web page at a website on the World Wide Web or a local area network.

As another example, the client device 102 of FIG. 1 could be a full scale computing platform, such as a desktop or notebook personal computer, equipped with a wireless communication interface to facilitate communication over the wireless network. For instance, a personal computer could be linked to a 3G or more advanced handheld device, or the personal computer could include an integrated chipset or plug-in card (e.g., PCI card or PCMCIA such as the AirCard® available from Sierra Wireless, Inc.) that provides for wireless communication.

The client device 102 may communicate with an access point for the wireless network, such as a base station 106, through an air interface 104. While FIG. 1 depicts one client device 102 accessing the wireless network for voice and/or data services through air interface 104, the wireless network may simultaneously provide service to a plurality of different client devices over one or more air interfaces. The air interface 104 may carry wireless communications in compliance with any radio communication protocol. This description will consider the CDMA radio communication protocol by way of example. CDMA is merely one example of a protocol that can be used for communication between the client device 102 and the access point 110. The client device 102 and the base station 106 may alternatively or additionally communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA"), Worldwide Interoperability for Microwave Access ("WiMAX"), Integrated Digital Enhanced Network ("iDEN"), or other protocols. Additional wireless protocols, such as any IEEE 802.11 protocols, Bluetooth™, or others, may also be used.

CDMA provides a method for sending wireless signals between the client device 102 and the base station 106. In a CDMA system, the base station 106 communicates with the client device 102 over a spread spectrum of frequencies. In such a CDMA system, multiple client devices may use the same frequency range, and the multiple client devices may each simultaneously communicate with the base station 106 using the same frequency range. Spreading the signal across a wide bandwidth can reduce interference between signals from different client devices.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

The base station 106 of FIG. 1 may be coupled to a base station controller ("BSC") 108, which can perform various functions, such as managing handoffs of the client device 102 as it moves among other base stations in the wireless network. Preferably, the client device 102 may establish a data connection with the wireless network in order to engage in packet-switched communications with another entity, such as the content server 116 or the content server 118. To establish such a data connection, the BSC 108 may interface with a packet data serving node ("PDSN") 110. The PDSN 110 can provide connectivity to a packet-switched network 114, which may comprise either or both of a private packet-switched network and a public packet-switched network, such as the Internet.

More specifically, each client device that supports packet-data connectivity can engage in packet-data communication over a packet network, such as the packet-switched network 114, after acquiring a radio link over an air interface and a data link with a PDSN. For example, client device 102 can send an origination message to BSC 108 asking for a radio link for packet-data communication. The BSC 108 can then responsively instruct the client device 102 to operate on a given traffic channel over the air interface 104. Through that traffic channel, the client device 102 might then negotiate with PDSN 110 to establish a data link.

In the exemplary system illustrated by FIG. 1, a network node, such as a gateway or proxy server, may be disposed in the data connection path between the client device 102 and the content server 116 or the content server 118. For example, as shown, a network node 112 may be located between the PDSN 110 and the packet-switched network 114. Alternatively, and not shown in FIG. 1, the network node 112 may be part of the PDSN 110. As another alternative, also not shown in FIG. 1, the network node 112 may be located elsewhere within the data connection path between the client device 102 and the content server 116 or the content server 118, so long as data communications between the client device 102 and content servers connected to the packet-switched network 114 are routed through the network node 112.

An example of the network node 112 in the present invention might be a WAP gateway. A WAP gateway, in addition to carrying out the functions described in the present invention, may also transcode web content being sent from the content servers 116 or 118 to the client device 102. This transcoding serves to put the transmitted web content and HTTP signaling into a form suitable for reference by, for example, a microbrowser on the client device 102. The network node 112 might also function, alternatively or additionally, as a proxy server or as a web portal.

To conduct data communications with other entities, such as the content servers 116 and 118, the client device 102 might use various protocols to engage in packet-based communications on the packet-switched network 114. In accessing the wireless network for data services, the client device 102 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the client device 102 may communicate with the PDSN 110 through a PPP session, it may communicate with other entities on the packet-switched network 114 using higher level protocols. For example, the client device 102 may use the Transmission Control Protocol ("TCP")/Internet Protocol ("IP") protocol suite for transmitting and receiving data over a packet-switched network. Under TCP/IP, each network entity, including the client device 102, may receive an IP address. The IP address assigned to an entity is usually unique, and therefore allows IP packets of data to be routed between different networks to a particular entity.

Additionally, the client device 102 may use the HTTP application-layer protocol to send and receive messages. The HTTP/1.1 protocol is defined by W3C's Network Working Group's RFC 2616, which is incorporated herein by reference in its entirety. The HTTP/1.0 protocol is defined in RFC 1945 and is also incorporated herein by reference in its entirety.

As a general matter, the network node 112 preferably sits within an HTTP communication path between the client device 102 and a content server 116 and 118, so that it can detect and act on HTTP communications that pass between the client 102 and a content server 116 or 118. The HTTP communication path between the client device and the content server can take various forms. Generally speaking, it is the path along which a request for content passes from the client device 102 to the content server 116 or 118 and along which a response to the request passes from the content server 116 or 118 to the client device 102.

A request for content may be carried by a single HTTP request message that is sent from the client device 102 to the content server 116 or 118. Or a request for content may be carried in multiple HTTP request messages, such as one that is sent from the client device 102 to the network node 112 and another that is then sent from the network node 112 to the content server 116 or 118, for instance.

Similarly, the requested content may be carried in an HTTP response message that is sent from the content server 116 or content server 118 to the client device 102. Additionally or alternatively, the content may be carried in multiple HTTP response messages, where a portion of the content is carried in each response message. Or the content may be carried in multiple HTTP response messages where one content message is sent from the content servers 116 or 118 to a network node 112 and another content message is then sent from the network node 112 to the client device 102.

Additional steps may exist as well. For example, the browser running on client device 102 may generate an HTTP GET request, seeking content from content server 116. The client device 102 may then open a Transmission Control Protocol (TCP) socket with content server 116 and send the GET request through the network node 112 and through the packet-switched network 114 to the IP address of content server 116. It is further possible that the network node 112 may not act transparently. Rather, separate TCP sockets may exist between the client device 102 and the network node 112 on one hand and the network node 112 and content server 116 on the other hand. Thus, the communication path may carry a request for content in an HTTP GET request from the client device 102 to the network node 112 and then in another HTTP GET request from the network node 112 to the content server 116.

Content server 116 and content server 118 are shown in FIG. 1 as separate and distinct servers for illustrative purposes only. For example, content server 116 may contain a requested web page and content server 118 may contain one or more objects that are referenced by the web page, such as images for display within the rendered web page. Alternatively, content servers 116 and 118 may be the same server, which includes both the web page and the linked objects. For example, a web page URL may be addressed as http://www.example.com and an object referenced by the web page may be addressed as URL http://www.example.com/image1.jpg, wherein both URLs are present on a single content server.

Figure 2:
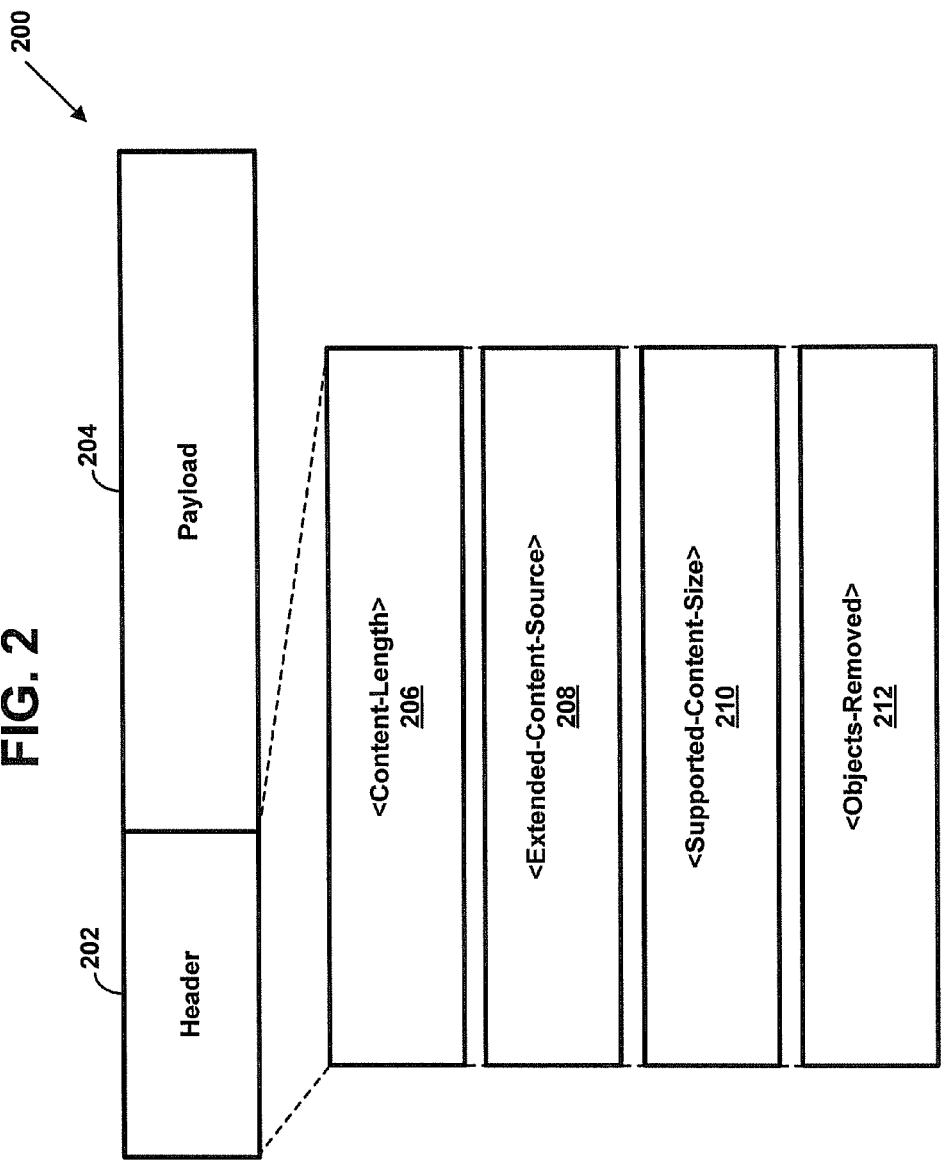
FIG. 2 is a block diagram illustrating the structure within an exemplary HTTP message packet.

FIG. 2 illustrates the structure of an example HTTP message packet 200. An HTTP message packet can include a header portion and a data portion. The header portion generally identifies a source device, a destination device, and it may also contain additional data in dedicated header fields. The data portion generally carries content data to be transmitted between the two entities.

As illustrated in FIG. 2, the header 202 may contain header fields and the payload 204 may contain data, such as content data. Each header field may be defined by a field name and may contain field data content. The field data content may also be referred to as the field's value. The exemplary HTTP embodiments described herein contemplate the use of header fields to transmit, for example, information about the content size of requested or referenced content. For example, header 202 may contain, in no particular sequence relative to other header fields, a Content-Length header field 206. The following HTTP exemplary message packet shows, for example, a portion of a content response message which includes a Content-Length header field 206 with a value of 1000:

HTTP/1.1 200 OK
    Server: IBM HTTP Server/2.0.42.2-PK13230 Apache/
      2.0.47 (Unix) DAV/2
    Content-Type: application/xhtml+xml;charset=UTF-8
    Content-Language: en <Content-Length: 1000>
. . .

The client device 102 or the network node 112 may use the Content-Length header field 206 to determine the size of the transmitted message. Such use will be further discussed in reference to FIG. 3 and subsequent figures.

The header 202 may additionally or alternatively contain, among other header fields and in no particular sequence, an Extended-Content-Source header field 208. The following HTTP example message packet shows a portion of a content response message which includes an Extended-Content-Source header field 208 with a value of "image1.jpg, Content-Length=2000":

HTTP/1.1 200 OK
    Server: IBM_HTTP_Server/2.0.42.2-PK13230 Apache/
        2.0.47 (Unix) DAV/2
    Content-Type: application/xhtml+xml;charset=UTF-8
    Content-Language: en
    <Content-Length: 1000>
    <Extended-Content-Source: image1.jpg, Content-Length=2000>
. . .

The client device 102 or the network node 112 may use the Extended-Content-Source header field 208 to determine the size of referenced objects, such as the image1.jpg picture object listed in the above example. Such use will be further discussed in reference to FIG. 3 and subsequent figures.

Further, the header 202 may additionally or alternatively contain, among other header fields and in no particular sequence, a Supported-Content-Size header field 210. The following HTTP example message packet shows a portion of a content request message which includes a Supported-Content-Size header field 210 with a value of 3200:

GET http://vision.sprintpcs.com
    Host: vision.sprintpcs.com
    Accept: application/xhtml+xml
    Accept-Charset: utf-8, utf-16, us-ascii, iso-8859-1, *
    <Supported-Content-Size: 3200>
. . .

Alternatively, the Supported-Content-Size header field 210 may be transmitted as part of an HTTP response message, as in the following example:

HTTP/1.1 200 OK
    <Supported-Content-Size: 3200>
. . .

In any case, and whether part of a request message or a response message, the Supported-Content-Size header field 210 may be used to instruct the network node 112 as to the resource limitations of the client device 102. For example, the Supported-Content-Size header field 210 may define the largest content object that the client device may receive. Alternatively, the Supported-Content-Size header field 210 may define the total aggregate content size that the client device 102 may receive.

Figure 3:
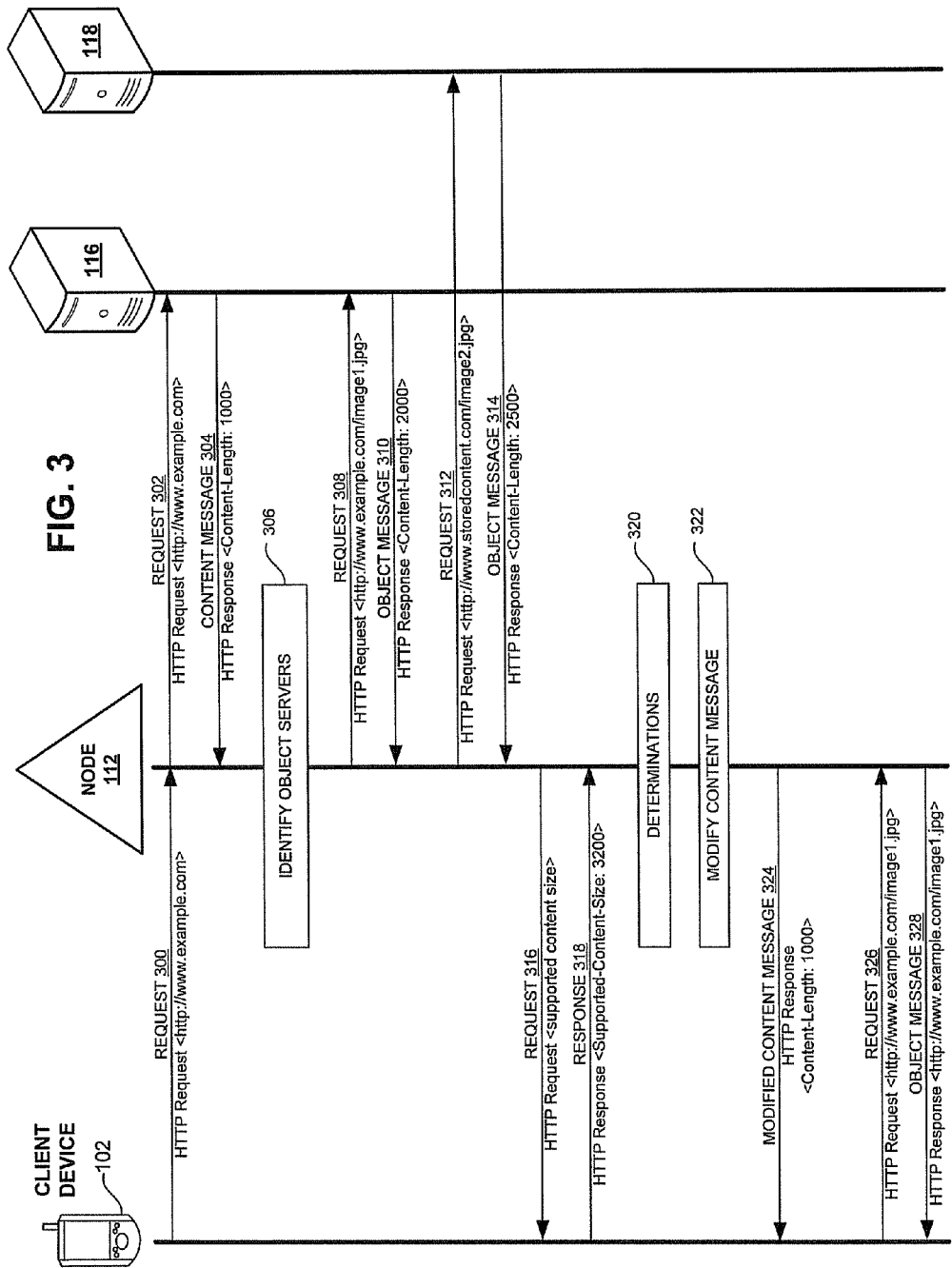
FIG. 3 is an exemplary message flow diagram illustrating an embodiment of the invention.

FIG. 3 is an exemplary message flow diagram illustrating an embodiment of the present method. When a user of client device 102 attempts to view a web page, such as www.example.com, the client device 102 may establish and send a request message 300 addressed to the URL, which may be located at content server 116. The request 300 is preferably an HTTP request message, such as an HTTP GET request.

Prior to being received by the content server 116, the request 300 may be received by the network node 112. The network node 112 may then forward the request 300 to the content server 116 as request 302. Request 302 may be the original request 300 passed through the 112 node 112 or request 302 may be a new or modified version of request 300 that originates at the network node 112.

Content server 116 may, in response to receiving content request 302, send a content response message 304. The response 304 may contain the HTML web page, which includes references to various content objects within the page. For example, the HTML web page may contain a reference to www.example.com/image1.jpg located at content server 116 and a reference to www.storedcontent.com/image2.jpg located at content server 118. Additionally, the response 304 may contain a Content-Length header field 206 that describes the size of the HTML web page. For example, the Content-Length header field 206 may contain a value of 1000, which preferably indicates that the HTML web page contained within the response 304 is 1,000 bytes long. As another example, the Content-Length header field 206 may instead indicate that the response 304, or the payload 204 of response 304, is 1,000 bytes long, and therefore the HTML web page contained within response 304 is 1,000 bytes or less in size.

The value contained within any Content-Length header field 206 (or any other header field containing size information described herein) may be of any unit of measurement relating to information storage capacity. The byte unit of measure is used here for exemplary purposes only and the value may instead be defined by any accepted unit of measure, such as bits, kilobytes, megabytes, etc. In order to avoid ambiguous value units, it is preferable that a single standard be used, such as bytes. However, other solutions are possible. For example, the Content-Length header field 206 may contain both the value and the unit of measure, for example <Content-Length: 1000 bytes>. Alternatively, another header field may be used to transmit the unit of measure defining the Content-Length value.

After receiving the response 304, the network node 112 at block 306 may then identify which object servers contain the referenced objects within the requested web page. In the current example, the network node would read the HTML code received in response 304 and identify content server 116 as containing referenced object image1.jpg and content server 118 as containing referenced object image2.jpg.

The network node may then send a request 308 to content server 116 requesting www.example.com/image1.jpg and a request 312 to content server 118 requesting www.storedcontent.com/image2.jpg. In response, content server 116 may send image1.jpg in a response 310 to network node 112 and content server 118 may send image2.jpg in a response 314 to network node 112. The response 310 may contain a Content-Length header field 206 that describes the size of image1.jpg, which is shown in FIG. 3 to be a value of 2,000 bytes. The network node 112 may determine the size of content object image1.jpg by reading the value of Content-Length header field 206. Alternatively, the network node 112 may determine the size of image1.jpg by examining the received image1.jpg object and calculating the size directly.

Similarly, response 314 may contain a Content-Length header field 206 that describes the size of image2.jpg, which is shown in FIG. 3 to be a value of 2,500 bytes. The network node 112 may determine the size of content object image1.jpg by reading the value of Content-Length header field 206. Alternatively, the network node 112 may determine the size of image2.jpg by examining the received image2.jpg object and calculating the size directly.

In an alternative embodiment, the response 304 may contain a plurality of Content-Length header fields 206 that each describes the size of a referenced object, such as image1.jpg and image2.jpg. For example, a relevant code portion of response 304 might read:

HTTP/1.1 200 OK
   Server: IBM_HTTP_Server/2.0.42.2-PK13230 Apache/2.0.47 (Unix) DAV/2
   Content-Type: application/xhtml+xml;charset=UTF-8
   Content-Language: en
   <Content-Length: 1000>
   <Extended-Content-Source: image1.jpg, Content-Length=2000>
   <Extended-Content-Source: image2.jpg, Content-Length=2500>
   . . .
   <span>EXAMPLE BODY TEXT</span>
   <img src="http://www.example.com/image1.jpg">
   <img src="http://www.storedcontent.com/image2.jpg">

In this alternative embodiment, the network node 112 would not have to identify object servers at block 306, nor would the network node 112 have to send requests 308 and 312 or receive responses 310 and 314.

Preferably, after receiving the content request 300 and before sending the requested content to the client device 102, the network node 112 may send a request 316 to the client device 102 requesting the client device's supported content size. The client device 102 may then send a response 318 containing the client device's supported content size. The supported content size may be transmitted in a Supported-Content-Size header field 210. As shown in FIG. 3 example, the Supported-Content-Size header field 210 has a value of 3,200 bytes.

In an alternative embodiment, the supported content size of the client device 102 may be transmitted along with the initial request 300. Preferably the supported content size of the client device 102 would be transmitted in a Supported-Content-Size header field 210. In another embodiment, the supported content size of the client device 102 may be stored in a database accessible to, or located at, the network node 112. In the latter embodiment, the network node may simply lookup the supported content size, as opposed to querying the client device 102 with request 316.

Preferably, the supported content size of the client device 102 is the largest aggregate content size that the client device 102 can successfully process and/or render. For example, in FIG. 3, the client device 102 reports a supported content size of 3,200 bytes. The initially requested web page is reported as 1,000 bytes at response 304; the image1.jpg referenced object is reported as 2,000 bytes at response 310; and the image2.jpg referenced object is reported as 2,500 bytes at response 314. Therefore, the aggregate content size of the fully rendered web page would be 5,500 bytes, (i.e., 1,000+2,000+2,500=5,500), which is greater than the 3,200 bytes supported by the client device 102. Consequently, the client device 102 would be unable to render the full web page with all content objects shown.

At block 320, the network node 112 may make determinations on how to handle the request 300 for content from the client device 102. Preferably, the network node 112 will determine the aggregate content size by summing the reported content length values for the initial content message 304 and for at least one, and preferably each, referenced object within the requested web page, as reported in the Content-Length header fields 206 for each content object. The network node 112 may then compare that value to the reported supported content size value of the client device 102, as obtained, for example, from the Supported-Content-Size header field of response 318. If the aggregate content size to be delivered is less than the supported content size of the client device 102, the network node 112 may deliver the content message 304 unmodified to the client device 102. (Message flow not shown in FIG. 3.) If the aggregate content exceeds the supported content size of the client device 102, the network node 112 may then modify the content message at block 322 before sending it to the client device 102.

When the network node 112 modifies the content message 304 at block 322 to create modified content message 324, the network node 112 may remove references to content objects so that the client device 102 may process and/or render the web page with fewer objects in order to stay within the supported content size limit. For example, the network node 112 may successively eliminate references to each of the remaining largest content objects, until such time as the aggregate content size of the remaining unremoved references and the message itself is below the supported content size limit. Alternatively, the network node 112 may eliminate references according to some other algorithm or protocol, for example, by successively removing references from the end of the HTML code and progressing towards the beginning of the HTML code. For purposes of the method disclosed herein, any method of removing references will work, provided that sufficient references are removed to bring the aggregate content size below the supported content size limit.

As an example, the original content response message 304 may contain the following code portions:

HTTP/1.1 200 OK
   Server: IBM_HTTP_Server/2.0.42.2-PK13230 Apache/2.0.47 (Unix) DAV/2
   Content-Type: application/xhtml+xml;charset=UTF-8
   Content-Language: en
   <Content-Length: 1000>
   . . .
   <span>EXAMPLE BODY TEXT</span>
   <img src="http://www.example.com/image1.jpg">
   <img src="http://www.storedcontent.com/image2.jpg">

Because image2.jpg has a reported content size value of 2500 bytes according to response 314, removing the reference to image2.jpg would reduce the aggregate content size of the fully rendered web page from 5,500 bytes, as calculated earlier, to 3,000 bytes, which is within the supported content size of the client device 102. Consequently, the network node 112 may modify the above portion of response 304 by removing the HTML reference to image2.jpg. The relevant code portion of modified content message 324 would then be:

HTTP/1.1 200 OK
   Server: IBM_HTTP_Server/2.0.42.2-PK13230 Apache/2.0.47 (Unix) DAV/2
   Content-Type: application/xhtml+xml;charset=UTF-8
   Content-Language: en
   <Content-Length: 1000>
   . . .
   <span>EXAMPLE BODY TEXT</span>
   <img src="http://www.example.com/image1.jpg">
   . . .

In an alternative embodiment, the network node 112 could remove the reference by merely deleting the "img src" string value. The relevant code portion of modified content message 324 would then instead be:

HTTP/1.1 200 OK
   Server: IBM_HTTP_Server/2.0.42.2-PK13230 Apache/2.0.47 (Unix) DAV/2
   Content-Type: application/xhtml+xml;charset=UTF-8
   Content-Language: en

```
<Content-Length: 1000>
. . .
<span>EXAMPLE BODY TEXT</span>
<img src=" ">
. . .
```

In another alternative embodiment, the network node 112 could remove the reference to image2.jpg and replace it with a small placeholder image or text.

The network node 112 may also insert into the modified content message 324 an indication that the network node 112 has removed one or more object references. For example, in the alternative embodiment described above, the small placeholder image or text that replaced the image2.jpg may serve to indicate that the image2.jpg object has been removed. In another example, the network node 112 could insert or modify an Extended-Content-Source header field 208 within the content response message 324. For example, the relevant code portion of modified content message 324 might read:

```
HTTP/1.1 200 OK
Server: IBM_HTTP_Server/2.0.42.2-PK13230 Apache/
    2.0.47 (Unix) DAV/2
Content-Type: application/xhtml+xml;charset=UTF-8
Content-Language: en
<Content-Length: 1000>
<Extended-Content-Source:  image2.jpg,  Content-
    Length=0>
. . .
<span>EXAMPLE BODY TEXT</span>
<img src="http://www.example.com/image1.jpg">
. . .
```

The "<Extended-Content-Source: image2.jpg, Content-Length=0>" header field would serve to indicate that image2.jpg had been removed, as indicated by the Content-Length value of "0". Alternatively, another header field could be used to signal that one or more content objects had been removed. For example, the network node 112 could insert or modify an Objects-Removed header field 212 within the content response message 324. For example, the relevant code portion of modified content message 324 might read:

```
HTTP/1.1 200 OK
Server: IBM_HT_TP Server/2.0.42.2-PK13230 Apache/
    2.0.47 (Unix) DAV/2
Content-Type: application/xhtml+xml;charset=UTF-8
Content-Language: en
<Content-Length: 1000>
<Objects-Removed: TRUE>
```

The Objects-Removed header field 212 could be a Boolean value as shown in the example, or, for example, it could be an integer value reflecting the number of objects removed.

The network node 112 may then send the modified content message 324 to the client device 102. The client device 102 may then request only the referenced objects contained within message 324. For example, the client device 102 may send request 326 for the image1.jpg object and receive the object the in response 328; however, the client device 102 would not request the image2.jpg object. Alternatively, the client device 102 could attempt to request the empty string value that replaced the image2.jpg. An error could result from the request for the empty string, but advantageously, no additional content objects would be sent to the device.

Figure 4:
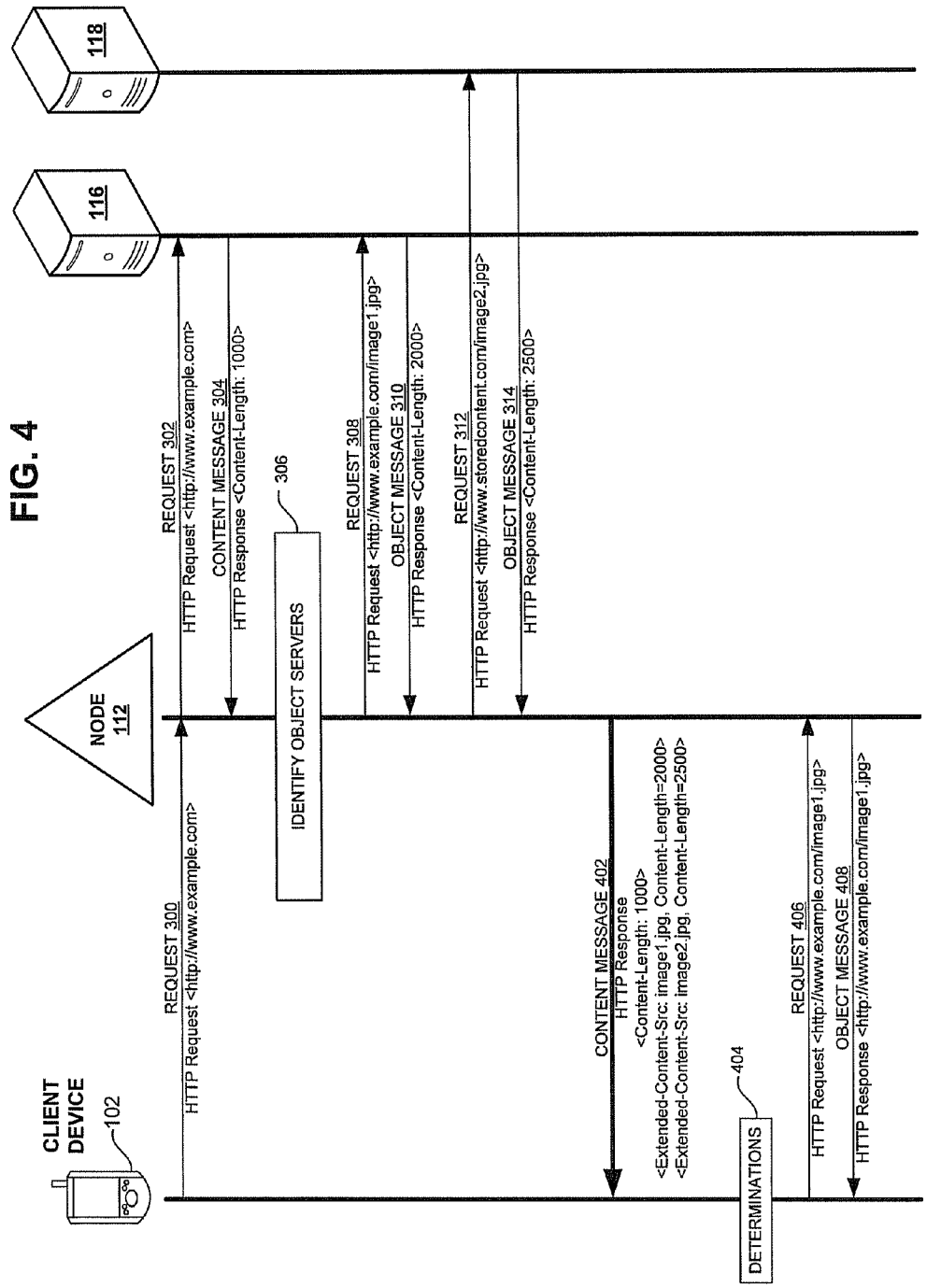
FIG. 4 is an exemplary message flow diagram illustrating an embodiment of the invention.

FIG. 4 is an exemplary message flow diagram illustrating another embodiment of this invention. The message flow described in FIG. 4 illustrates a method whereby the client device 102 receives content size information from the network node 112 and then the client device 102 determines which referenced objects to request. FIG. 4 shares many elements in common with FIG. 3, including all steps up to and including the network node 112 receiving the content object response messages 310 and 314 from the content servers 116 and 118.

Upon receiving content object messages (e.g., responses 310 and 314) responsive to all of its content requests (e.g., requests 308 and 312), the network node 112 may send a modified version of content response message 304 to the client device 102 in response to the client device's original request 300. The network node 112 may create a modified content response message 402 by adding referenced object content size information to the content response message 304. For example, a portion of the original content response message 304 might read:

```
HTTP/1.1 200 OK
Server: IBM_HTTP_Server/2.0.42.2-PK13230 Apache/
    2.0.47 (Unix) DAV/2
Content-Type: application/xhtml+xml;charset=UTF-8
Content-Language: en
<Content-Length: 1000>
. . .
<span>EXAMPLE BODY TEXT</span>
<img src="http://www.example.com/image1.jpg">
<img src="http://www.storedcontent.com/image2.jpg">
. . .
```

The modified content response message 402 would then read:

```
HTTP/1.1 200 OK
Server: IBM_HTTP_Server/2.0.42.2-PK13230 Apache/
    2.0.47 (Unix) DAV/2
Content-Type: application/xhtml+xml;charset=UTF-8
Content-Language: en
<Content-Length: 1000>
<Extended-Content-Source:  image1.jpg,  Content-
    Length=2000>
<Extended-Content-Source:  image2.jpg,  Content-
    Length=2500>
. . .
<span>EXAMPLE BODY TEXT</span>
<img src="http://www.example.com/image1.jpg">
<img src="http://www.storedcontent.com/image2.jpg">
. . .
```

For each referenced object, the network node 112 would add an Extended-Content-Source header field 208 that identifies the object and describes the object's size.

Upon receiving the response 402, the client device 102, at block 404, may then determine which referenced objects to request, based on the size of the objects. First, the client device 102 may determine its own supported content size. Preferably, the client device 102 could calculate its resource availability and calculate the maximum supported content size that it could receive. Alternatively, the client device 102 could rely upon a stored value indicating the supported content size. Using the same types of determinations as described with respect to blocks 320 and 322 in FIG. 3, the client device 102 may determine that the aggregate content size of the response 402, as specified and if fully rendered with all referenced objects, would exceed the supported content size of the client device. Consequently, the client device 102 may decide to not request objects that would cause the displayed web page to exceed the resources of the client device 102. In determining which objects not to request, the client device 102 may eliminate objects according to any of the schemes described with respect to FIG. 3, such as successive elimination of the largest objects, or any other algorithm or protocol. For purposes of the method disclosed herein, any manner of eliminating objects will work, provided that sufficient objects are eliminated to bring the aggregate requested content size below the supported content size limit.

For example, the client device may decide to not request the image2.jpg object due to the reported content size of image2.jpg. Consequently, the client device 102 may send request 406 for the image1.jpg object and receive the object in response 408; however, the client device 102 would not request the image2.jpg object. The client device 102 may replace the image2.jpg object with a small placeholder image or other text that serves to alert the user that an image has been removed. Alternatively, the client device 102 may display nothing additional to indicate that an object has been removed from the final web page render.

Figure 5:
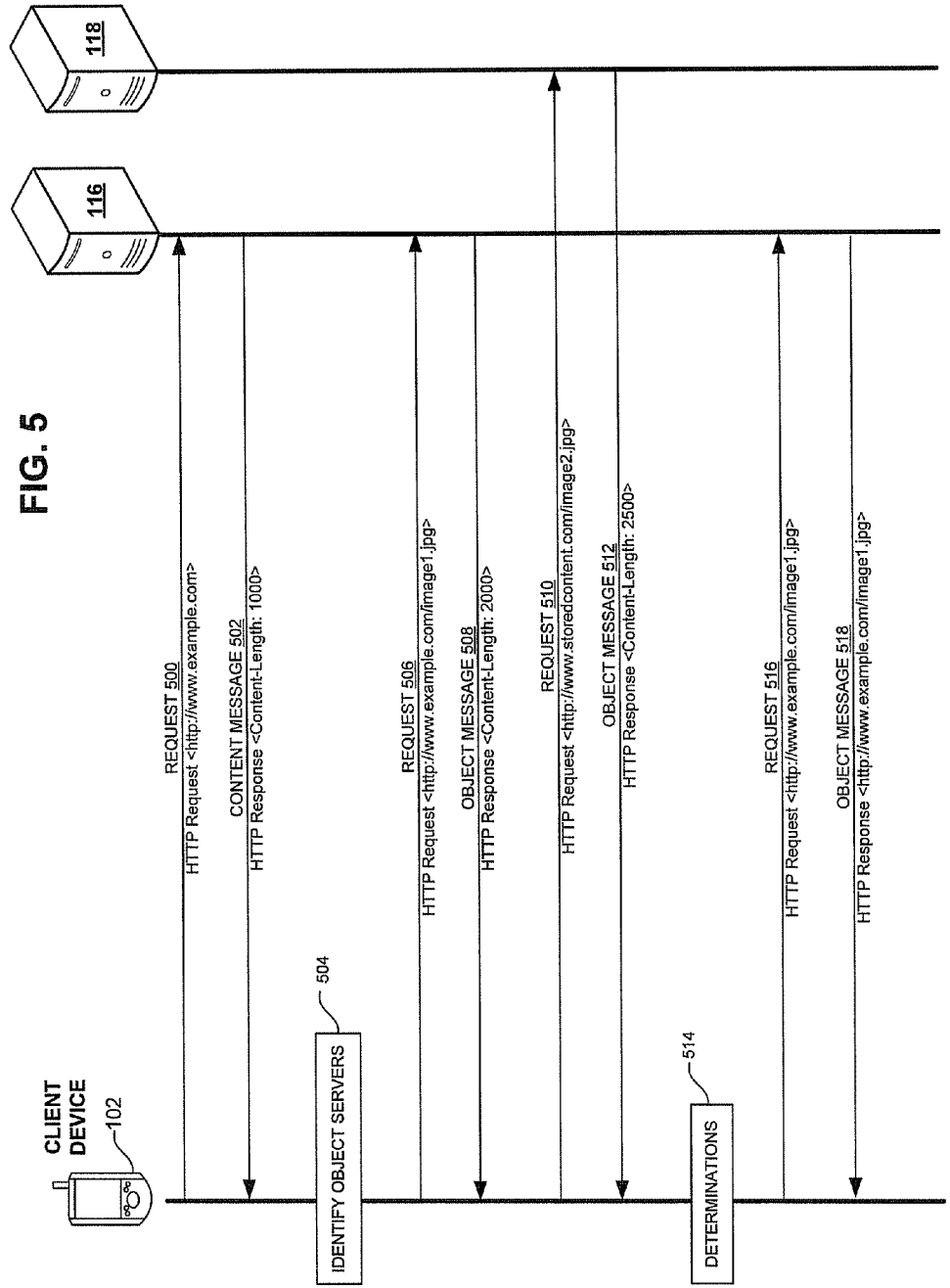
FIG. 5 is an exemplary message flow diagram illustrating an embodiment of the invention.

FIG. 5 is an exemplary message flow diagram illustrating another embodiment of this invention. The message flow depicted in FIG. 5 illustrates a method whereby the client device 102 receives content size information from the content servers 116 and 118 and then the client device 102 determines which referenced objects to request. Similar to the message flow described with respect to FIG. 3, when a user of client device 102 attempts to view a web page, such as www.example.com, the client device 102 may establish and send a request message 500 addressed to the URL, which may be located at content server 116. The request 500 is preferably an HTTP request message, such as an HTTP GET request.

Content server 116 may, in response to receiving content request 500, send a content response 502. The response 502 may contain the HTML web page, which includes references to various content objects within the page. For example, the HTML web page may contain a reference to www.example.com/image1.jpg located at content server 116 and a reference to www.storedcontent.com/image2.jpg located at content server 118. Additionally, the response 502 may contain a Content-Length header field 206 that describes the total size of the HTML web page. For example, the Content-Length header field 206 may contain a value of 1000, which preferably indicates that the HTML web page contained within the response 502 is 1,000 bytes long. As another example, the Content-Length header field 206 may instead indicate that the response 502, or the payload of 204 of response 502, is 1,000 bytes long, and therefore the HTML web page contained within response 502 is 1,000 bytes or less in size.

After receiving the response 502, the client device 102, at block 504, may then identify the object servers that contain the referenced objects within the requested web page. In the example, the client device 102 would read the HTML received in response 502 and identify content server 116 as containing referenced object image1.jpg and content server 118 as containing referenced object image2.jpg.

The client device 102 may then send request 506 to content server 116 requesting information regarding the size of image1.jpg and request 510 to content server 118 requesting information regarding the size of image2.jpg. In response, content server 116 may send a response 508 to client device 102 containing a Content-Length header field 206 which describes the size of image1.jpg, which is shown in FIG. 5 to be a value of 2,000 bytes. Likewise, content server 118 may send a response 512 to client device 102 containing a Content-Length header field 206 which describes the size of image2.jpg, which is shown in FIG. 5 to be a value of 2,500 bytes. Importantly, neither response 508 nor response 512 would contain the requested object.

Upon receiving the responses 502, 508, and 512, the client device 102, at block 514, may then determine which referenced objects to request, based on the size of the objects. Preferably, the client device 102 could calculate its resource availability and calculate the maximum supported content size that it could receive. Alternatively, the client device 102 could rely upon a stored value indicating the supported content size.

Using the same types of determinations as described with respect to blocks 320 and 322 in FIG. 3, the client device 102 may determine that the aggregate content size of response 502, as specified and if fully rendered with all referenced objects, would exceed the supported content size of the client device 102. Consequently, the client device 102 may decide to not request objects that would cause the displayed web page to exceed the resources of the client device. For example, the client device may decide to not request the image2.jpg object due to its reported content size. The client device 102 may send request 516 for the image1.jpg object and receive the object in response 518; however, the client device 102 would not request the image2.jpg object.

The client device may replace the image2.jpg object with a small placeholder image or other text that serves to alert the user that an image has been removed. Alternatively, the client device 102 may display nothing additional to indicate that an object has been removed from the final web page render.

Figure 6:
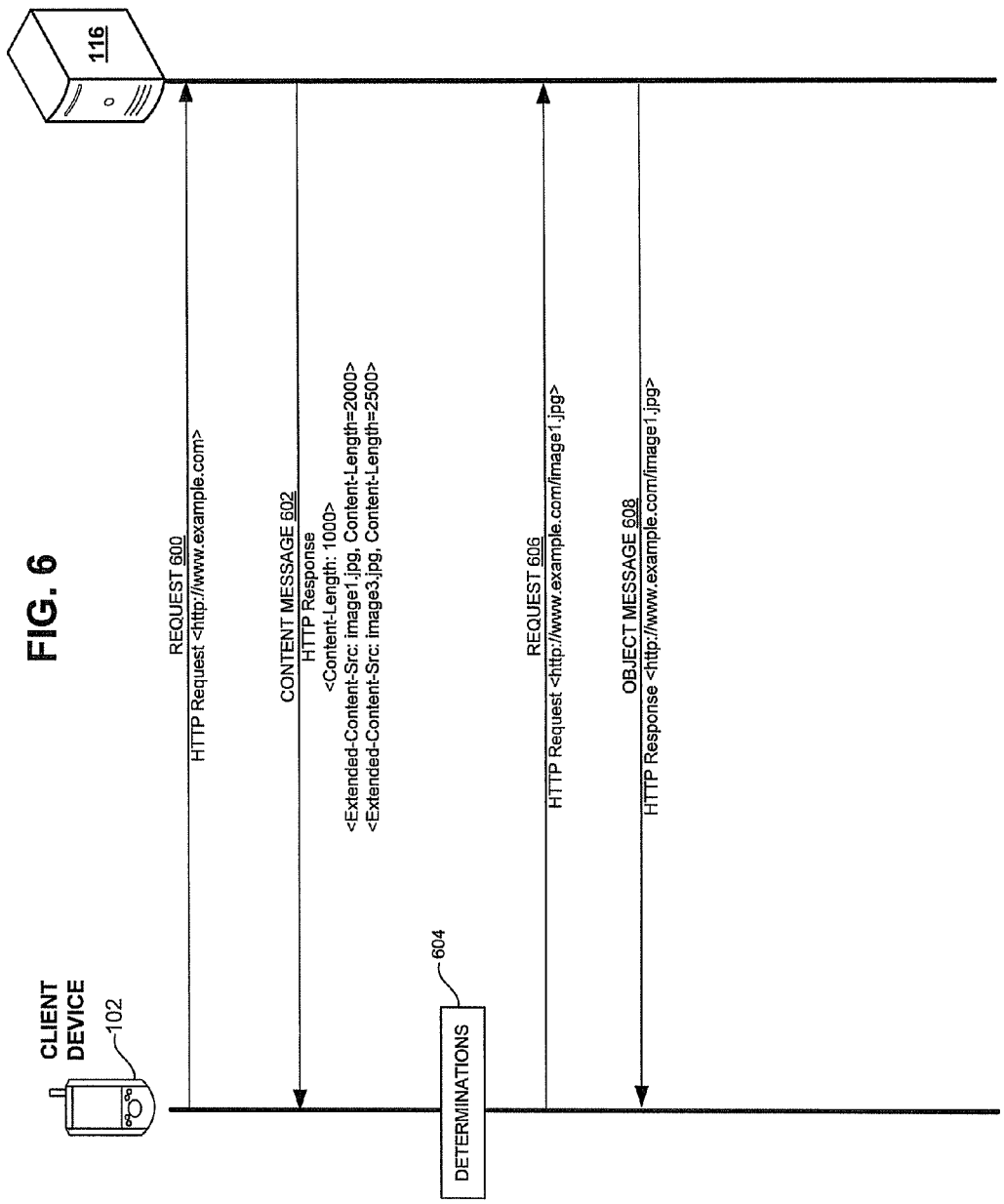
FIG. 6 is an exemplary message flow diagram illustrating an embodiment of the invention.

FIG. 6 is an exemplary message flow diagram illustrating another embodiment of this invention. The message flow described in FIG. 6 illustrates a method whereby the client device 102 receives content size information from the content server 116 and then the client device 102 determines which referenced objects to request.

Similar to the message flow described with respect to FIG. 5, when a user of client device 102 attempts to view a web page, such as www.example.com, the client device 102 may establish and send a request message 600 addressed to the URL, which may be located at content server 116. The request 600 is preferably an HTTP request message, such as an HTTP GET request.

Content server 116 may, in response to receiving content request 6000, send a content response message 602. The response 602 may contain the HTML web page, which includes references to various content objects within the page. For example, the HTML web page may contain a reference to www.example.com/image1.jpg located at content server 116 and a reference to www.example.com/image3.jpg, also located at content server 116. Additionally, the response 602 may contain a Content-Length header field 206 that describes the total size of the HTML web page. For example, the Content-Length header field 206 may contain a value of 1000, which preferably indicates that the HTML web page contained within the response 602 is 1,000 bytes long. As another example, the Content-Length header field 206 may instead indicate that the response 602, or the payload of 204 of response 602, is 1,000 bytes long, and therefore the HTML web page contained within response 602 is 1,000 bytes or less in size.

The response 602 may also contain a Content-Length header field 206 which describes the size of image1.jpg, which is shown in FIG. 6 to be a value of 2,000 bytes. Additionally, the response 602 may also contain a Content-Length header field 206 which describes the size of image3.jpg, which is shown in FIG. 6 to be a value of 2,500 bytes.

Upon receiving the response 602, the client device 102, at block 604, may then determine which referenced objects to request, based on the size of the objects. Using the same types of determinations as described with respect to blocks 320 and 322 in FIG. 3, the client device 102 may determine that the aggregate content size of response 602, as specified and if fully rendered with all referenced objects, would exceed the supported content size of the client device 102. Consequently, the client device 102 may decide to not request objects that would cause the displayed web page to exceed the resources of the client device. For example, the client device may decide to not request the image3.jpg object due to its reported content size. Consequently, the client device 102 may send request 606 for the image1.jpg object and receive the object in response 608; however, the client device 102 would not request the image3.jpg object. The client device may replace the image3.jpg object with a small placeholder image or other text that serves to alert the user that an image has been removed. Alternatively, the client device 102 may display nothing additional to indicate that an object has been removed from the final web page render.

FIG. 7 is a block diagram illustrating exemplary components of a network node 112 in accordance with an embodiment of the present invention. The network node 112 may include a network communication interface 702, a processor (i.e., one or more processors) 704, and data storage 706, all of which are communicatively coupled through a system bus 708. Other arrangements are possible as well.

The network communication interface 702 may include a chipset for performing network communications. Performing network communications may include transmitting data using wireless connection or using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The network communication interface 702 may transmit various types of data through the packet-switched network 114 or the PDSN 110 and/or receive various types of data through the packet-switched network 114 or the PDSN 110. For example, the network communication interface 702 may receive a request for content sent from the client device 102 and may send it or a modified request for content to the content servers 116 and/or 118, both preferably in the form of IP packets that carry HTTP communications.

The data storage 706 may comprise one or more volatile and/or nonvolatile storage components such as magnetic, optical, or organic storage and may store various types of data. The data storage 706 may store program logic 710 (e.g., program instructions) executable by the processor 704. The program logic 710 may contain instructions executable by the processor 704 to provide services such as receiving requests for content, extracting information from those requests, storing information (e.g. supported content size of mobile devices), looking up information (e.g., content size information or supported content size) in data storage 706, modifying messages, and sending modified and unmodified messages to various network addresses.

In a preferred embodiment, the network node 112 would be located as shown in FIG. 1. In such a location, the network node 112 may easily intercept requests, responses, and any other messages transmitted between the client device 102 and content servers 116 or 118. For example, the program logic 710 may contain instructions to sniff the header and/or data portions of each message passing through the network node 112. If the message is a content response from a content server, such as content server 116, and directed to a client device, such as client device 102, the network node 112 may interrupt the transmission. For example, if the message is an HTTP response, the processor 704 may pause transmission of the IP packet(s) that carry the HTTP message (i.e., temporarily pause the HTTP communication). Subsequently, the network node 112, by means of the processor 704, may then use instructions in the program logic 710 to accomplish those tasks described with respect to blocks 306, 320, and 322 in FIG. 3. The foregoing example of program logic 710 instructions is intended to be exemplary only. It should be understood that the program instructions stored in the data storage 706 are executable by the processor 704 to carry out any of the network node functions described herein.

As previously described, the network node 112 need not be disposed between the PDSN 110 and the packet-switched network 114; instead, the network node 112 can be disposed in the communication path anywhere downstream from the air interface 104. For example, the network node 112 may be communicatively coupled to the packet-switched network 114 such that data communications between the client device 102 and content servers 116 or 118 are routed through the network node 112. As an example, the network node 112 may be located in the same local network as the content servers 116 or 118 and be able to intercept messages directed to network entities on that local network, including messages directed to the content servers 116 or 118. To accomplish this, the network node 112 may have the same TCP/IP prefix as the content servers 116 or 118. Further, the network node 112 or another network entity may have program logic that includes instructions to substitute the network node 112 as the destination for messages that were received into the local network from a client device 102 and originally directed to the content servers 116 or 118.

The invention described herein is beneficial for at least the following reasons. The embodiments described may reduce network traffic by preventing the transmission of content objects that could never be successfully displayed or otherwise presented on a client device. Another benefit provided by the invention is that a client device may be able to render (or otherwise process or present) content that would have otherwise overwhelmed its resource limits. While displaying some content, but preventing the receipt and display (or other presentation) of content objects that exceed the client device's capabilities, the client device may operate more effectively.

Exemplary embodiments of the present invention have been shown and described. Other examples within the scope of the claimed invention are possible. For example, the client device 102 may communicate solely via a wireline interface, instead of the exemplary wireless interface 104 described with respect to FIG. 1. As another example, the network node may instead be any network intermediary, such as a proxy server or a web portal, for example. Those of ordinary skill in the art will appreciate that numerous modifications from the embodiments described are possible, while remaining within the scope of the claims.

We claim:

1. A method comprising:
   a network node receiving from a content server a content message directed to a client device, wherein the content message includes a plurality of object references, each referencing respectively an object that is not contained in the content message, including a first object reference that references a first object that is not contained in the content message;
   determining at the network node an object size of the first object that is not contained in the content message;
   determining at the network node a supported content size for the client device;

at the network node, (i) based upon the determined object size of the first object that is not contained in the content message and based upon the determined supported content size of the client device, making a determination to remove from the content message the first object reference that references the first object, and (ii) responsive to the determination, modifying the content message by removing the first object reference; and sending the modified content message from the network node to the client device.

2. The method of claim 1, wherein modifying the content message further comprises the network node inserting into the modified content message an indication that the network node has removed the first object reference.

3. The method of claim 1, wherein modifying the content message further comprises the network node inserting into the modified content message an indication that the network node has removed at least one object reference if the modified content message does not indicate that at least one object reference has been removed.

4. The method of claim 1, further comprising determining a content message size of the content message, wherein making the determination based upon the determined object size of the first object that is not contained in the content message and based upon the determined supported content size of the client device comprises making the determination based upon at least (i) the determined object size of the first object that is not contained in the content message, (ii) the determined supported content size of the client device, and (iii) the determined content message size.

5. The method of claim 1, wherein determining the supported content size for the client device comprises the network node querying data storage to determine the supported content size of the client device.

6. The method of claim 1, wherein determining the supported content size for the client device comprises:
the network node sending to the client device a request for the supported content size; and
receiving the supported content size transmitted from the client device in response to the request.

7. The method of claim 1, wherein determining the object size of the first object that is not contained in the content message comprises, at the network node:
identifying an object server hosting the first object;
sending a request for the first object to the object server;
receiving the first object transmitted by the object server in response to the request; and
calculating the object size of the received first object.

8. The method of claim 1, wherein determining the object size of the first object that is not contained in the content message comprises, at the network node:
identifying an object server hosting the first object;
sending a request to the object server; and
receiving from the object server, in response to the request, an indication of object size.

9. The method of claim 1, wherein the content message includes an indication of the object size of the first object referenced by the first object reference, and wherein determining the object size of the first object that is not contained in the content message comprises reading the indication from the content message.

10. The method of claim 1, wherein the content message is a Hypertext Transfer Protocol (HTTP) message.

11. A method comprising:
sending from a client device a content request;
receiving at the client device a content message responsive to the content request, wherein the content message includes an object reference that references an object that is not contained in the content message;
determining at the client device an object size of the object that is referenced by the object reference in the content message but that is not contained in the content message;
determining at the client device a supported content size for the client device; and
at the client device (i) based upon the determined object size of the object and the determined supported content size of the client device, making a determination of whether to request the object, (ii) if the determination is to request the object, then requesting the object, and (iii) if the determination is to not request the object, then not requesting the object.

12. The method of claim 11, further comprising determining a content message size of the content message, wherein making the determination based upon the determined object size of the object and the determined supported content size of the client device comprises making the determination based upon at least (i) the determined object size of the object, (ii) the determined supported content size of the client device, and (iii) the determined content message size.

13. The method of claim 11, wherein determining the object size of the object comprises, at the client device:
identifying an object server hosting the object;
sending a request to the object server; and
receiving from the object server, in response to the request, an indication of object size.

14. The method of claim 11, wherein the content message includes an indication of the object size of the object, and wherein determining the object size of the object comprises reading the indication from the content message.

15. The method of claim 11, wherein the content message is a Hypertext Transfer Protocol (HTTP) message.

16. A network node comprising:
a network interface for providing connectivity with a network;
a processor;
data storage; and
program instructions stored in the data storage and executable by the processor to carry out functions including:
(i) receiving from a content server a content message directed to a client device, wherein the content message includes a plurality of object references, each referencing respectively an object that is not contained in the content message, including a first object reference that references a first object that is not contained in the content message;
(ii) determining an object size of the first object that is not contained in the content message;
(iii) determining a supported content size for the client device;
(iv) based upon the determined object size of the first object that is not contained in the content message and based upon the determined supported content size of the client device, making a determination to remove from the content message the first object reference that references the first object, and responsive to the determination, modifying the content message by removing the first object reference; and
(v) sending the modified content message from the network node to the client device.

* * * * *